US010346782B2

(12) United States Patent
Tiell

(10) Patent No.: US 10,346,782 B2
(45) Date of Patent: Jul. 9, 2019

(54) ADAPTIVE AUGMENTED DECISION ENGINE

(71) Applicant: Accenture Global Solutions Limited, Dublin (IE)

(72) Inventor: Steven C. Tiell, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 559 days.

(21) Appl. No.: 15/188,779

(22) Filed: Jun. 21, 2016

(65) Prior Publication Data

US 2017/0364825 A1    Dec. 21, 2017

(51) Int. Cl.
*G06Q 10/06*     (2012.01)

(52) U.S. Cl.
CPC ....... *G06Q 10/0635* (2013.01); *G06Q 10/063* (2013.01)

(58) Field of Classification Search
None
See application file for complete search history.

(56) References Cited

U.S. PATENT DOCUMENTS

| 2010/0271931 A1* | 10/2010 | Cheng | H04B 7/024 370/210 |
| 2013/0346496 A1* | 12/2013 | Maarek | G06Q 50/01 709/204 |
| 2015/0229665 A1* | 8/2015 | Foster | H04L 63/1433 726/22 |
| 2015/0339477 A1* | 11/2015 | Abrams | G06F 21/554 726/23 |
| 2016/0104163 A1* | 4/2016 | Aquino | G06Q 20/4016 705/44 |
| 2017/0296085 A1* | 10/2017 | Beshiri | A61B 5/0452 |

* cited by examiner

*Primary Examiner* — Li Wu Chang
(74) *Attorney, Agent, or Firm* — Fish & Richardson P.C.

(57) ABSTRACT

Techniques are described for adaptive and augmented decision making by an artificial intelligence (AI) engine, such as an engine that employs machine learning techniques. A decision-making process may be executed to make a decision regarding operations of the organization, and the AI engine may be employed to analyze the various aspects of a decision and determine a risk level associated with the decision. The risk level may be a combination of the probability of a negative outcome and a magnitude of loss that may occur due to a negative outcome. The automated process may also determine a confidence level that indicates a degree of confidence in the determined risk level. Risk and confidence may be independent values. Implementations may enable risk mitigation by providing a risk estimate with higher confidence than traditional methods.

17 Claims, 5 Drawing Sheets

ADAPTIVE AUGMENTED DECISION ENGINE

BACKGROUND

In various types of organizations, decisions may be made regarding the operations of the organization. An organization may operate computing systems that execute decision engines that are programmed with artificial intelligence routines or other types of algorithms to automatically make decisions. Such automated decision engines may access input data and analyze the data to determine a result of the decision. However, traditional decision engines may output the result and not provide any reasons as to why the particular result was determined. Because traditional decision engines may fail to provide visibility into the decision making process, traditional decision engines may make it difficult or impossible to improve the decision making process and enable higher confidence in the decision results.

SUMMARY

Implementations of the present disclosure are generally directed to adaptive decision making. More specifically, implementations are directed to employing an AI engine to determine a risk level and a confidence level for a decision, and employing group(s) of reviewers to provide feedback regarding the determined risk level and confidence level, the feedback used to refine the model employed by the AI engine.

In general, innovative aspects of the subject matter described in this specification can be embodied in methods that include actions of: providing, based on a risk evaluation model, a risk level associated with a decision provided from an artificial intelligence (AI) engine, the risk evaluation model further providing a confidence level for the risk level; responsive to determining that the risk level is at least a risk threshold and the confidence level is less than a confidence threshold, communicating decision information for the decision to be reviewed by a first set of reviewers including multiple reviewers characterized by at least two different expertise key words; receiving recommendations from the first set of reviewers regarding the decision information; and responsive to determining that the recommendations indicate a consensus among the first set of reviewers, modifying the risk evaluation model based on first feedback information including the recommendations from the first set of reviewers, the risk level, and the confidence level.

Implementations can optionally include one or more of the following features: the actions further include determining a variance among the recommendations from the first set of reviewers; the first feedback information further includes the variance; the first feedback information further includes at least one monitored outcome of the decision; the actions further include responsive to determining that the risk level is less than the risk threshold and the confidence level is within a predetermined range of the confidence threshold, communicating, by the at least one processor, a summary of the decision information for the decision to a second set of reviewers; the actions further include receiving votes from the second set of reviewers recommending a full review and, in response, modifying, by the at least one processor, the risk evaluation model based on second feedback information including the risk level, the confidence level, and the votes recommending the full review; the actions further include generating the summary by performing natural language processing (NLP) on the decision information; the actions further include receiving from the second set of reviewers, at least one expertise key word that characterizes the reviewers to conduct the full review; the actions further include communicating the decision information for the decision to be reviewed by at least one reviewer characterized by the one or more expertise key words; the second feedback information further includes the at least one expertise key word received from the second set of reviewers; and/or the second set of reviewers is greater in number than the first set of reviewers.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. By employing feedback information generated by reviewer(s) regarding a decision, implementations allow for the refinement and improvement of a model employed by an artificial intelligence engine to evaluate a decision, and thus improve the operations of traditional computing devices employed in automated decision making. By refining, improving, or otherwise enhancing the models used to evaluate a decision, implementations provide a technical improvement over traditional decision engines. In particular, implementations provide a model that is more accurate, more efficient, and configured to operate while consuming less processor and/or memory resources compared to traditional decision engines. Implementation also provide a consideration for risk and confidence levels of that risk that traditional decision engines do not provide. By assessing potential risk in automated decision making, implementations enable an organization to consider brand value in data-informed decisions. Risks associated with digital trust and data ethics are particularly susceptible to positive feedback loops in the traditional systems and can scale out of control. Being able to account for such risks during the computational process (e.g., 216 below) gives data professionals and other practitioners a powerful tool to minimize risk, improve confidence levels, and/or abandon a particular hypothesis or course of action early in the decision supply chain.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the

DETAILED DESCRIPTION

Figure 1:
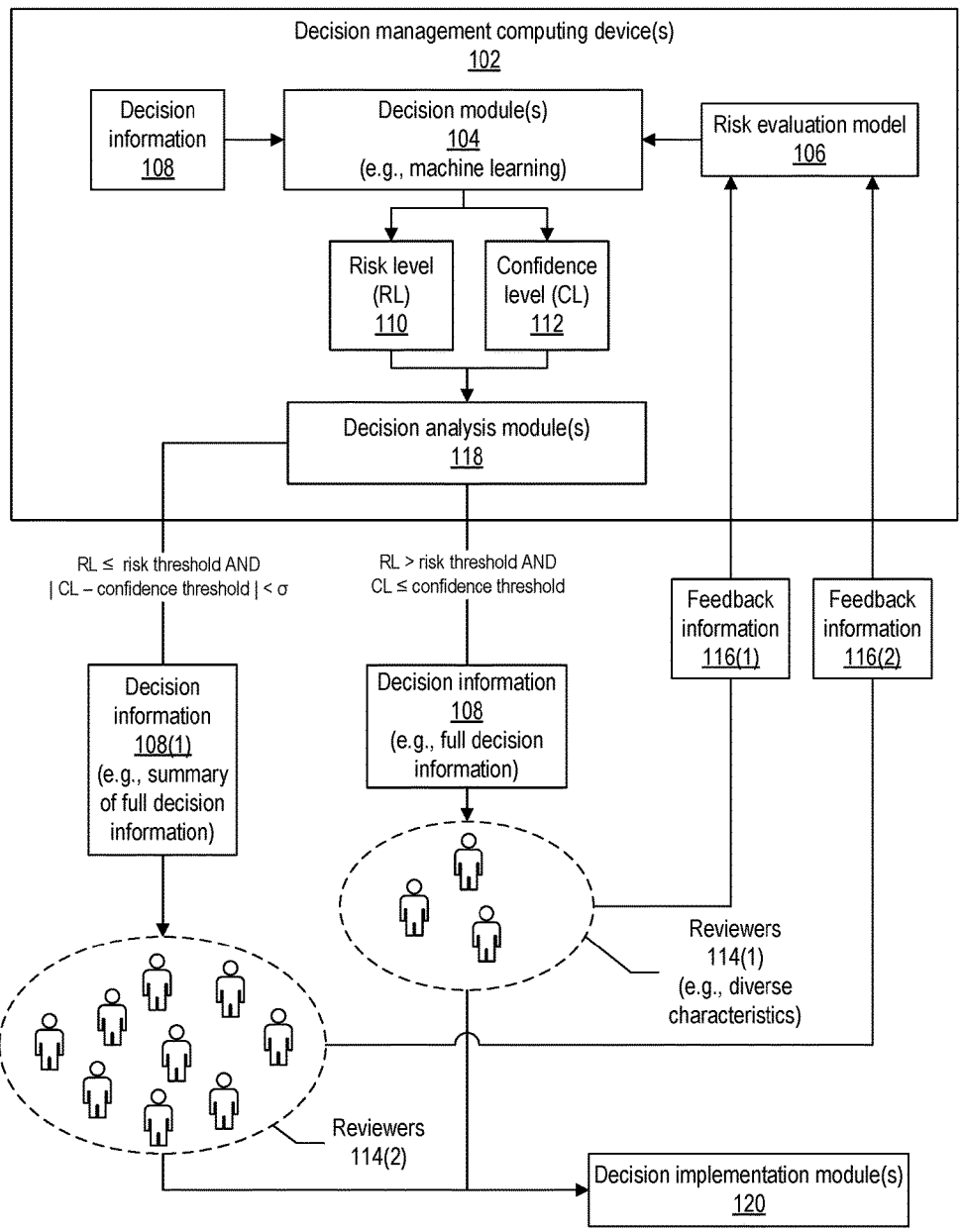
FIG. 1 depicts an example system for adaptive and augmented decision making, according to implementations of the present disclosure.

Implementations of the present disclosure are directed to systems, devices, methods, and computer-readable media for adaptive and augmented decision making by an artificial intelligence (AI) engine, such as an engine that employs machine learning techniques. Organizations may engage in a decision-making process to make a variety of decisions regarding operations of the organization. In some examples, an AI engine may be employed to analyze the various aspects of a decision and determine a risk level associated with the decision. The risk level may be a combination of the probability of a negative outcome and a magnitude of loss that may occur due to a negative outcome. For example, an organization may analyze a decision whether to invest in a real estate development project by making a $100 million loan to a developer. If the developer has a history of failed development projects, the probability of a negative outcome may be high (e.g., 75%). That probability, combined with the large amount of the loan, may lead to a determination of a high risk level. The automated process may also determine a confidence level that indicates a degree of confidence in the determined risk level. For example, the confidence level may range from 0 to 1 (or from 0% to 100%) where 1 indicates absolute confidence that the determined risk level is accurate and 0 indicates no confidence in the determined risk level. Risk and confidence may be independent values. For example, a high risk level may be determined with any degree of confidence, and a low risk level may also be determined with any degree of confidence. An organization may seek to mitigate the risk of its decisions where possible, and implementations may enable risk mitigation by providing a risk estimate with higher confidence than traditional methods.

Some implementations may provide for the augmentation of automated decision making in situations where the decision is determined to be a high risk decision, and where the confidence level in that determination is low. A high risk level may be indicated by a determined risk level being higher than a predetermined risk threshold, and a low risk level may be indicated by the determined risk level being lower than the predetermined risk threshold. A high confidence level may be indicated by a determined confidence level being higher than a predetermined confidence threshold, and a low confidence level may be indicated by the determined confidence level being lower than the predetermined confidence threshold. In some implementations a high or low risk level, or confidence level, may be determined based on comparison to different thresholds. For example, a high risk level may be determined when the risk level is above a first threshold and a low risk level may be determined when the risk level is below a second threshold, where the first threshold is higher than the second threshold. Similarly, a high confidence level may be determined when the confidence level is above a first threshold and a low confidence level may be determined when the confidence level is below a second threshold, where the first threshold is higher than the second threshold.

In some situations, a decision may be evaluated at a high risk level, but that evaluation may have a low confidence level. In such situations, there may be a desire within an organization to go forward with a decision (e.g., pursue a project) even though it may be risky, given the high potential rewards of a positive outcome. For example, a particular investment may have high risk but may also provide a high reward in a positive outcome, such as a large profit. Implementations may augment the output of the AI engine with additional information such as reviewer recommendations regarding whether the decision should proceed or not proceed. Implementations may also provide adaptations to the AI engine to enable the AI engine to leverage the additional information to improve the decision making capabilities of the AI engine.

FIG. 1 depicts an example system for adaptive and augmented decision making, according to implementations of the present disclosure. As shown in the example of FIG. 1, the system may include one or more decision management computing devices 102, which may include any type of computing device(s) such as server computers, distributed computing devices (e.g., cloud servers), and so forth. The decision management computing device(s) 102 may execute one or more decision module(s) 104. The decision module(s) 104 may comprise an AI engine. In some examples, the decision module(s) 104 may employ any type of machine learning technique(s) or algorithm(s) that perform supervised and/or unsupervised machine learning. The decision module(s) 104 may employ a risk evaluation model 106 to analyze decision information 108 regarding a decision to be made. Based on the analysis, the decision module(s) 104 may determine a risk level 110 for the decision and a confidence level 112 indicating a degree of confidence in the determined risk level 110. The decision information 108 may include any type of information that is relevant to the decision. For example, where the decision is whether to make a loan, the decision information 108 may indicate the parties involved (e.g., lender and loan recipient), the amount of the loan, the period of the loan, the interest rate, the purpose of the loan, or other terms and conditions of the loan agreement.

The risk level 110 and the confidence level 112 may be accessed by one or more decision analysis modules 118 executing on the decision management computing device(s) 102. In some implementations, the decision analysis module(s) 118 may determine one of multiple possible paths to follow to solicit additional information from reviewers 114 regarding the decision. For example, in situations where the risk level 110 is higher than a predetermined risk threshold and the confidence level is less than (e.g., and/or equal to) a predetermined confidence threshold, the decision information 108 may be sent to be (e.g., manually) reviewed by a first set of reviewers 114(1). In some implementations, the first set of reviewer(s) 114(1) may include reviewers with diverse characteristics or expertise. The various reviewers 114 may each be tagged or otherwise associated with one or more expertise key words that indicate the specialty, expertise, credentials, experience, or other characteristics of the reviewer. The first set of reviewer(s) 114(1) may include reviewers with different expertise key word(s). For example, the first set of reviewer(s) 114(1) may include at least one reviewer with expertise in finance, at least one reviewer with expertise in land development, at least one reviewer with legal expertise, and/or at least one reviewer with security expertise, and so forth.

The reviewer(s) 114(1) may review the decision information 108 and each may make a recommendation regarding the decision, such as whether to proceed or not proceed. If there is a consensus among the recommendations, and/or if the variance among the recommendations is below a variance threshold, the recommendations of the reviewers may be followed to either proceed or not proceed with the decision. In some examples, a consensus among a diverse set of reviewer(s) 114(1) (e.g., having different expertise key words) may provide greater confidence in the consensus decision.

In some implementations, the recommendations of the reviewer(s) 114(1) may be employed as feedback information 116(1) to refine, adapt, further train, or otherwise modify the risk evaluation model 106 used by the decision module(s) 104. The feedback information 116(1) may also include the risk level 110, the confidence level 112, the variance among the recommendation(s), or other information. In some implementations, if the decision is to proceed, the outcome(s) of that decision may be monitored and further employed as feedback information 116(1) to modify the risk evaluation model 106. For example, if the decision is to proceed with providing a loan to a developer for a real estate development project, the monitored outcome(s) may include whether development milestones are being met, whether loan payments are made on time or late, whether the developer is adhering to a construction schedule, and so forth. The outcome(s) may be fed back into the risk evaluation model 106, along with the other feedback information 116, to make the risk evaluation model 106 more intelligent for subsequent decision analysis.

In some situations, the decision analysis module(s) 118 may determine that the risk level 110 is less than (e.g., and/or equal to) a predetermined risk threshold. The decision analysis module(s) 118 may further determine that the confidence level 112 is within a predetermined range (e.g., σ in FIG. 1) of the confidence threshold, such that the absolute value of the difference between the confidence level 112 and the confidence threshold is less than the range. In such situations, a summary of the decision information may be generated using natural language processing (NLP) or other techniques. In some examples, the summary is a (e.g., short) version of the decision information 108 rendered in plain language, such as a one paragraph or one page summary of the relevant decision information 108. The summary may highlight or otherwise include those reasons why the decision analysis module(s) 118 determined that the summary review was merited. The summary decision information 108(1) may be sent to a second set of reviewers 114(2).

The reviewer(s) 114(2) may review the summary decision information 108(1) and vote whether a full review (e.g., a review based on the full decision information 108) is merited. The reviewer(s) 114(2) that vote for a full review may also submit various expertise key word(s) for the reviewer(s) 114(1) who they believe are suited to perform the full review. In this way, the reviewer(s) 114(2) may provide their judgement regarding whether a full review is merited as well as their recommended characteristic(s) of those reviewers who may perform the full review. If the reviewer(s) 114(2) reach a consensus regarding whether a full review is merited, and/or if the votes indicate a majority for full review, the decision information 108 may be sent to one or more reviewer(s) 114(1) having the recommended expertise key word(s). The recommendations of the reviewer(s) 114(1) may then be employed to determine whether to proceed with the decision as described above. In some examples, the votes of the reviewer(s) 114(2) may be binary (e.g., yes or no) indicating whether a full review is merited. The votes may also be values within a range of values, such as votes from 1 to 5 indicating gradations of opinions regarding whether a full review is merited. Sending the summary to the reviewer(s) 114(2) may enable the system to identify a pattern or characteristics of the decision that the decision module(s) 104 may not currently be able to identify using the current risk evaluation model 106.

The vote(s) of the reviewer(s) 114(2) may be provided as feedback information 116(2) to modify the risk evaluation model 106 as described above. The feedback information 116(2) may also include one or more of the risk level 110, the confidence level 112, or the monitored outcome(s) of the decision, as described above. In some implementations, the feedback information 116(2) includes the expertise key word(s) recommended by the reviewer(s) 114(2) who voted for the full review. The operations of the decision analysis module(s) 118 to adapt and augment the decision module(s) 104 (e.g., the AI engine) through modification of the risk evaluation model 106 are described further with reference to FIGS. 2A-2C.

Implementations enable the decision module(s) 104 to make a better (e.g., higher confidence) determination of the risk level 110 by modifying the risk evaluation model 106 based on reviewer feedback and monitored decision result(s). In some implementations, blockchains, smart contracts, and or other types of data structures may be employed to store information and/or perform operations as described herein. For example, a blockchain may be employed to store one or more of the following: the result(s) of the decision (e.g., whether to proceed or not), the risk level 110, the confidence level 112, the recommendation(s) of the reviewer(s) 114(1), the votes of the reviewer(s) 114(2), the recommended expertise key words received from the reviewer(s) 114(2), or the monitored outcome(s) of the decision. Use of a blockchain or other data structure may enable the tracking and/or interrogation of data regarding the decision throughout the decision making process and during the implementation of the decision if the analysis result is positive (e.g., proceed with the decision). Use of a blockchain or other data structure may also enable the automated feedback to modify the risk evaluation model 106 described herein. In some implementations, the automated feedback to refine the model may be performed by a smart contract that resides on, or is associated with, a blockchain that stores the various data regarding the decision.

In some examples, after the reviewers 114(1) and/or the reviewers 114(2) have reviewed the decision information 108, and after zero or more iterations of such review and/or refinement of the risk evaluation model 106, the decision information 108 and/or decision information 108(1) may be provided to one or more decision implementation modules 120. The decision implementation module(s) 120 may determine whether to proceed with the decision based on the decision information 108 and/or decision information 108(1). In instances where the decision implementation module(s) 120 determine to proceed with the decision, the decision implementation module(s) 120 may also execute and/or implement the decision.

Although FIG. 1 depicts the reviewers 114(1) and 114(2) as separate sets of individuals, implementations are not so limited. In some examples, the reviewer(s) 114(1) and the reviewer(s) 114(2) may be selected from a common pool of reviewers 114, such that there may be some overlap between the sets of reviewers. In some implementations, the reviewer(s) 114 may be under an obligation of confidentiality to not reveal any of the decision information 108, or the decision outcome, outside the organization. In some implementations, as in the example of FIG. 1, the first set of reviewer(s) 114(1) includes fewer reviewers than the second set of reviewer(s) 114(2). The particular numbers of reviewers 114(1) and 114(2) depicted in the example of FIG. 1 are not limiting. Implementations may employ any number of reviewer(s) 114 in each set of reviewers.

Implementations may employ any values for the risk threshold and the confidence threshold. In some examples, the risk threshold may be 0.5 on a scale from 0 to 1. In some examples, the confidence threshold may be 0.5 on a scale from 0 to 1, and the range (e.g., σ) may be 0.05.

In some implementations, the initial automated analysis of the decision module(s) 104 may be performed based on a set of standardized and/or labeled data regarding the decision being analyzed. Such data may be collected from application form(s) (e.g., a web page form), interview(s), sensor(s), or from other sources. The data may be stored in, and retrieved from, a database. Analysis of the data may be launched manually or as an automated process. In some examples, the data is processed by an automated system with insights resulting from models that are informed by machine learning algorithm(s). The automated decisions are augmented and adapted based on feedback received from the reviewer(s) 114. In some examples, the vote(s) and/or recommendation(s) of the reviewers 114 are employed to refine the risk evaluation model 106 used in the automated decision making. The autonomous decision making processes may result in automated decision making as described herein, with reviewer feedback employed to refine the processes based on reviewers' review(s), recommendation(s), vote(s), tag(s), and/or other feedback. The results of the decision making processes may cause the approval (e.g., moving forward) or disapproval (e.g., not moving forward) with a decision in an organization. In some instances, the result(s) may include (e.g., final) decisions that move responsibility to a responsible party and/or stakeholder within the organization. In some instances, the result(s) of the decision may be to move tasks through internal processes.

Figure 2A:
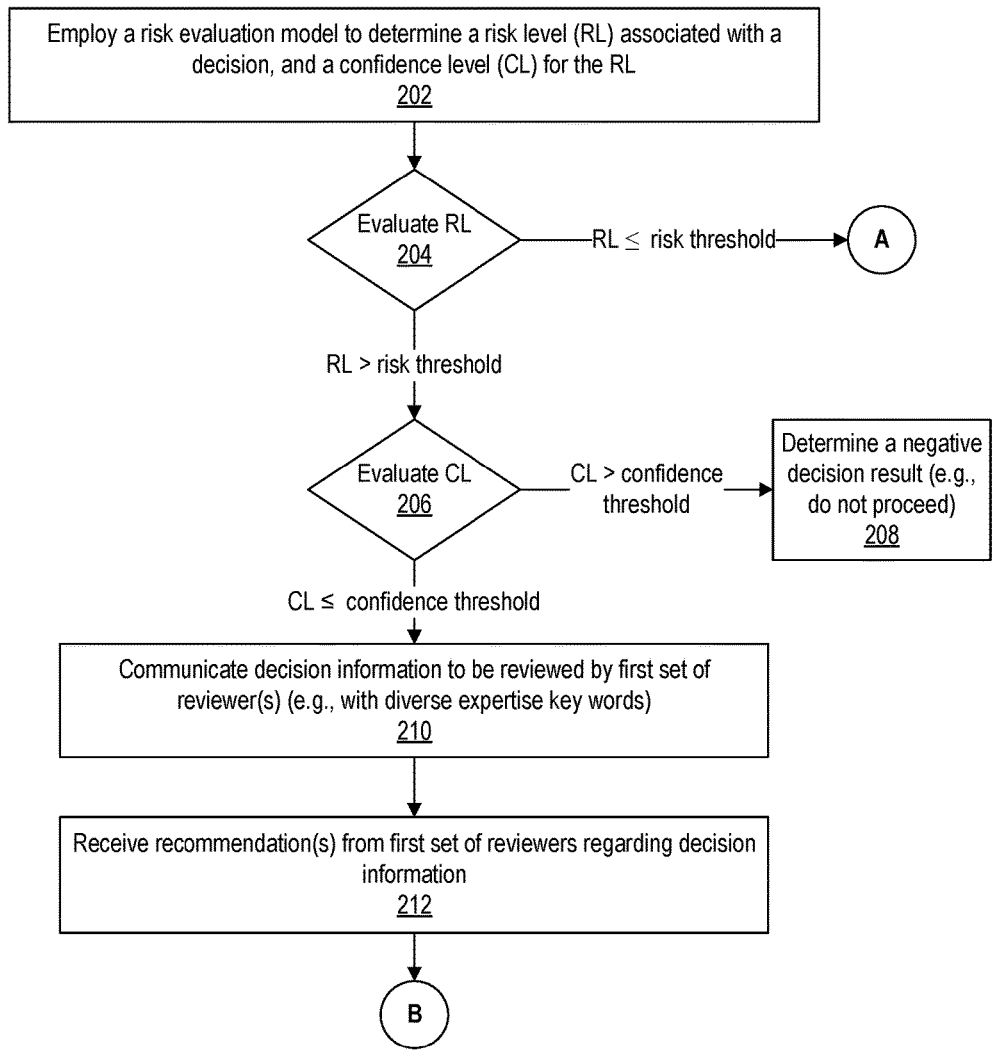
FIGS. 2A-2C depict a flow diagram of an example process for adaptive and augmented decision making, according to implementations of the present disclosure.
Figure 2B:
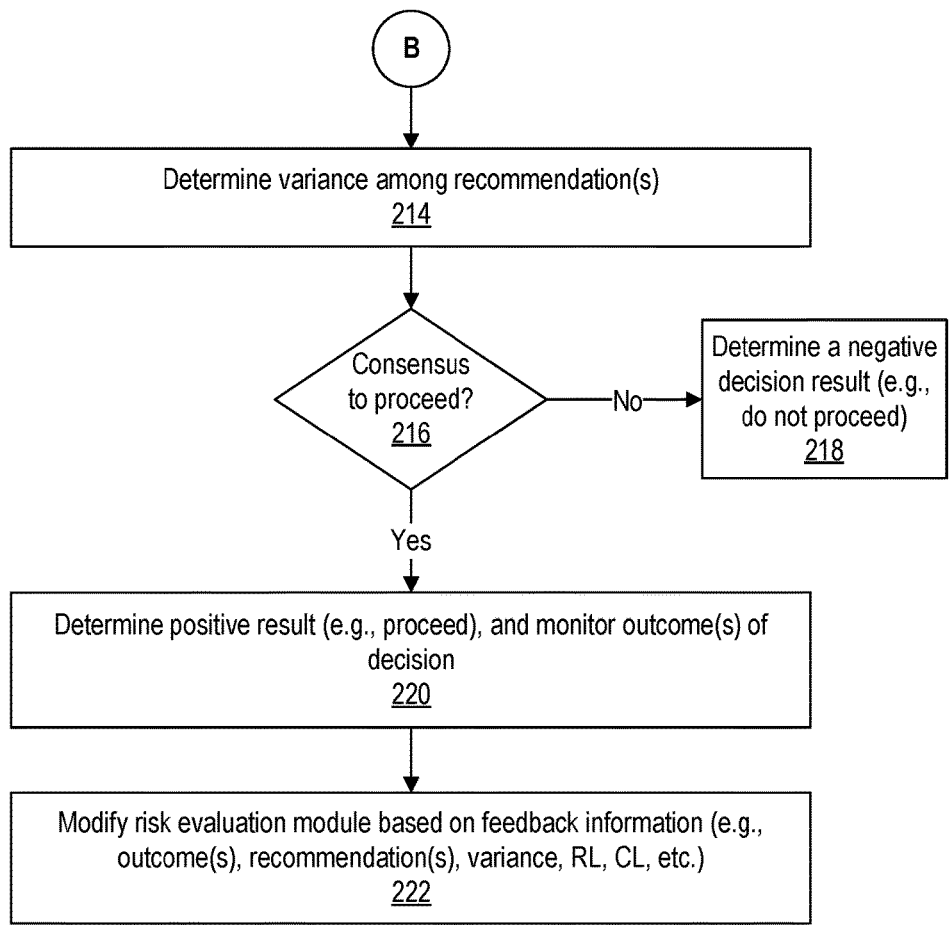
Figure 2C:
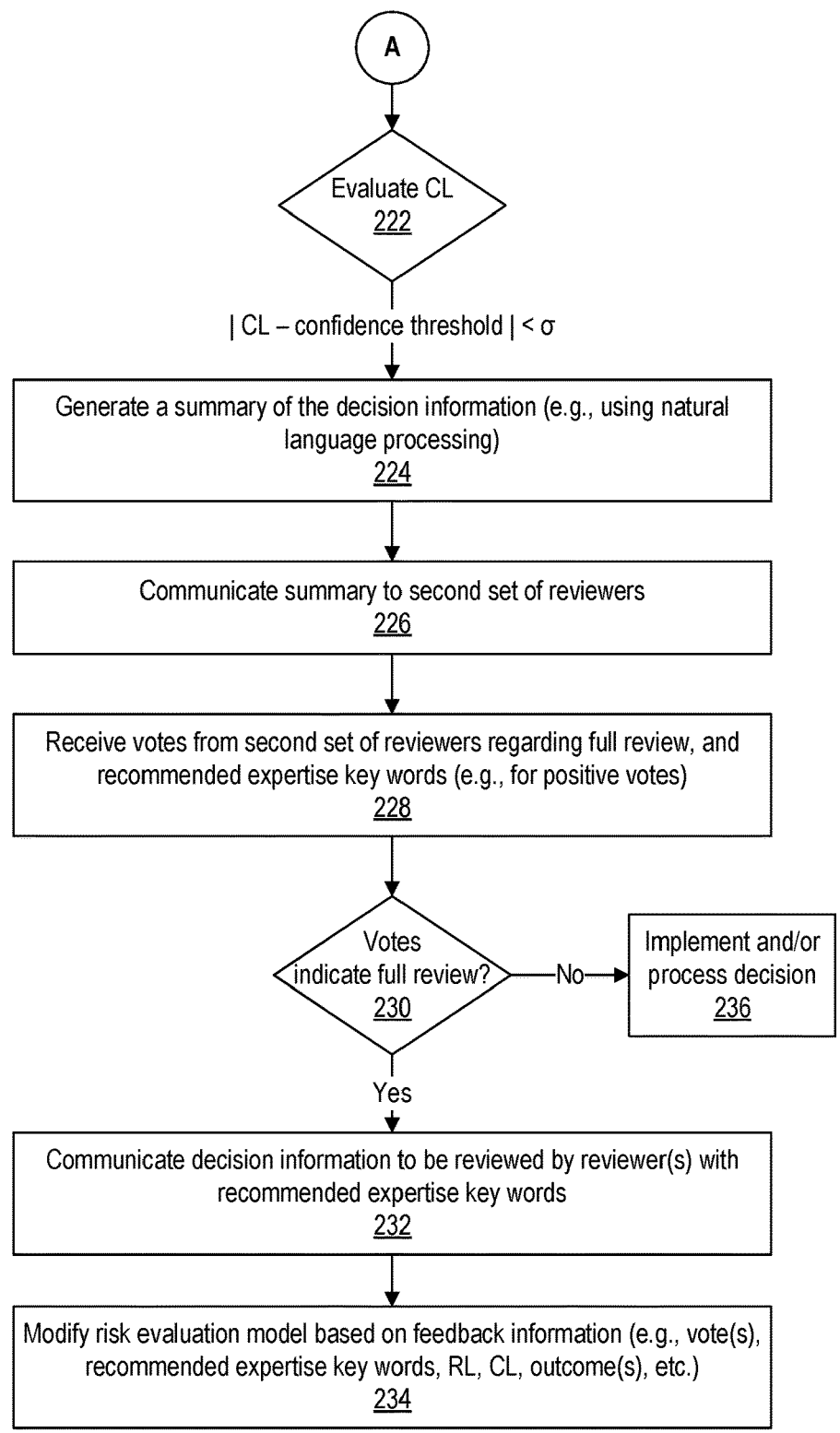

FIGS. 2A-2C depict a flow diagram of an example process for adaptive and augmented decision making, according to implementations of the present disclosure. Operations of the process may be performed by one or more of the decision module(s) 104, the decision analysis module(s) 118, or other software module(s) executing on the decision management computing device(s) 102 or elsewhere.

A risk evaluation model 106 may be employed (202) to determine a risk level 110 associated with a decision and a confidence level 112 that indicates a degree of confidence in the determined risk level 110. The risk level 110 may be evaluated (204). If the risk level 110 is less than (e.g., and/or equal to) a predetermined risk threshold, the process may proceed as described with reference to FIG. 2C. If the risk level 110 is greater than (e.g., and/or equal to) a predetermined risk threshold, the process may proceed to evaluate (206) the confidence level 112. If the confidence level is greater than a predetermined confidence threshold, a negative decision result may be determined (208). The negative decision result may be to not proceed with the decision. For example, in situations where the decision is whether to make a loan or invest in a project, a negative result may indicate that no loan or investment is to be made. Thus, a decision that involves high risk, determined with high confidence, may be automatically prevented from going forward.

If it is determined (206) that the confidence level 112 is less than (e.g., and/or equal to) the confidence threshold, the decision information 108 may be communicated (210) to be reviewed by a first set of reviewer(s) 114(1). As described above, the reviewer(s) 114(1) may be diverse and associated with different expertise key words. The recommendations may be received (212) from the reviewer(s) 114(1), e.g., recommending whether or not to proceed with the decision. The process may continue as described with reference to FIG. 2B.

In some implementations, a variance among the recommendations of the reviewer(s) 114(1) may be determined (214). A determination may be made (216) whether there is a consensus to proceed. Consensus may include a unanimous agreement among the reviewer(s) 114(1) regarding the decision (e.g., to proceed or not proceed). Consensus may also include a majority or some other threshold proportion of the reviewer(s) 114(1) agreeing on the result of the decision. In implementations where a variance is calculated, consensus may include the variance being less than a threshold variance. If there is no consensus to proceed, the negative decision result may be determined (218). If there is consensus to proceed, the positive decision result may be determined (220). In some implementations, the outcome(s) of the decision may be monitored as described above.

The risk evaluation model 106 may be refined, adjusted, or otherwise modified (222) based on feedback information 116(1) such as one or more of the reviewer recommendation(s), variance among the recommendation(s), risk level 110, confidence level 112, monitored outcome(s) of the decision, and so forth.

With reference to FIG. 2C, the confidence level 112 may be evaluated (222) to determine whether the confidence level 112 is within a predetermined range (e.g., σ) of the confidence threshold. If so, summary decision information 108(1) may be generated (224) as described above. In some implementations, NLP may be employed to generate the summary decision information 108(1). The summary decision information 108(1) may be communicated to a second set of reviewer(s) 114(2) for their review. The reviewer(s) 114(2) may vote on whether a full review is merited as described above. The votes of the reviewer(s) 114(2) may be received (228). In some examples, the reviewer(s) 114(2) who voted for full review may also submit their recommendations for expertise key word(s) of the reviewer(s) 114(1) to perform the full review.

In some implementations, the confidence level is the confidence a given algorithm has in the accuracy of its result. For example, with a confidence level of 20% an algorithm may have low confidence in its result, and the results across different execution instances of the algorithm may vary widely. A practitioner (e.g., data scientist) may view such a confidence level and recognize that there is a problem with the data, that the algorithm selected is inappropriate for the analysis at hand, and/or there is insufficient data to return a higher confidence. At the point in time when a low confidence level is returned, a practitioner may make a determination what the problem is and if that problem can be resolved, e.g. through data cleansing, aggregating additional datasets, selecting a different algorithm, etc. In some instances, a practitioner may work with product owners and/or insight owners to determine what these ranges are. For instance, such individuals might know that a certain risk level is acceptable provided there is a high confidence in that level of risk, but that same risk level would be unacceptable with a low confidence level.

A determination may be made (230) whether the votes of the reviewer(s) 114(2) indicate a full review. In some implementations, the votes may be analyzed to determine whether the reviewer(s) 114(2) have reached a consensus that recommends a full review. Consensus may be unanimous, a majority of votes, or a proportion of votes exceeding some other threshold proportion. In such instances, given the determination that the risk is sufficiently low and the confidence is sufficiently high, there may be no need for further human and/or expert review, and the decision may proceed to be implemented and/or processed (236), e.g., by the decision implementation module(s) 120. If the votes indicate that a full review is merited, the (e.g., full) decision information 108 may be communicated (232) to reviewer(s) 114(1) having the recommended expertise key word(s). The reviewer(s) 114(1) may review the decision information 108 and submit their recommendation(s) as described above.

The risk evaluation model 106 may be modified (234) based on feedback information 116(2). The feedback information 116(2) may include one or more of the vote(s) of the reviewer(s) 114(2), the recommended expertise key word(s) from the reviewer(s) 114(2), the monitored outcome(s) of the decision, the risk level 110, or the confidence level 112.

As used herein, the various comparison operators may each, in some implementations, include an equivalence condition. For example, A<B may be evaluated, in some implementations, as A≤B. Similarly, A>B may be evaluated, in some implementations, as A≥B. Moreover, A less than B may be evaluated, in some implementations, as A less than or equal to B. A greater than B may be evaluated, in some implementations, as A greater than or equal to B.

Figure 3:
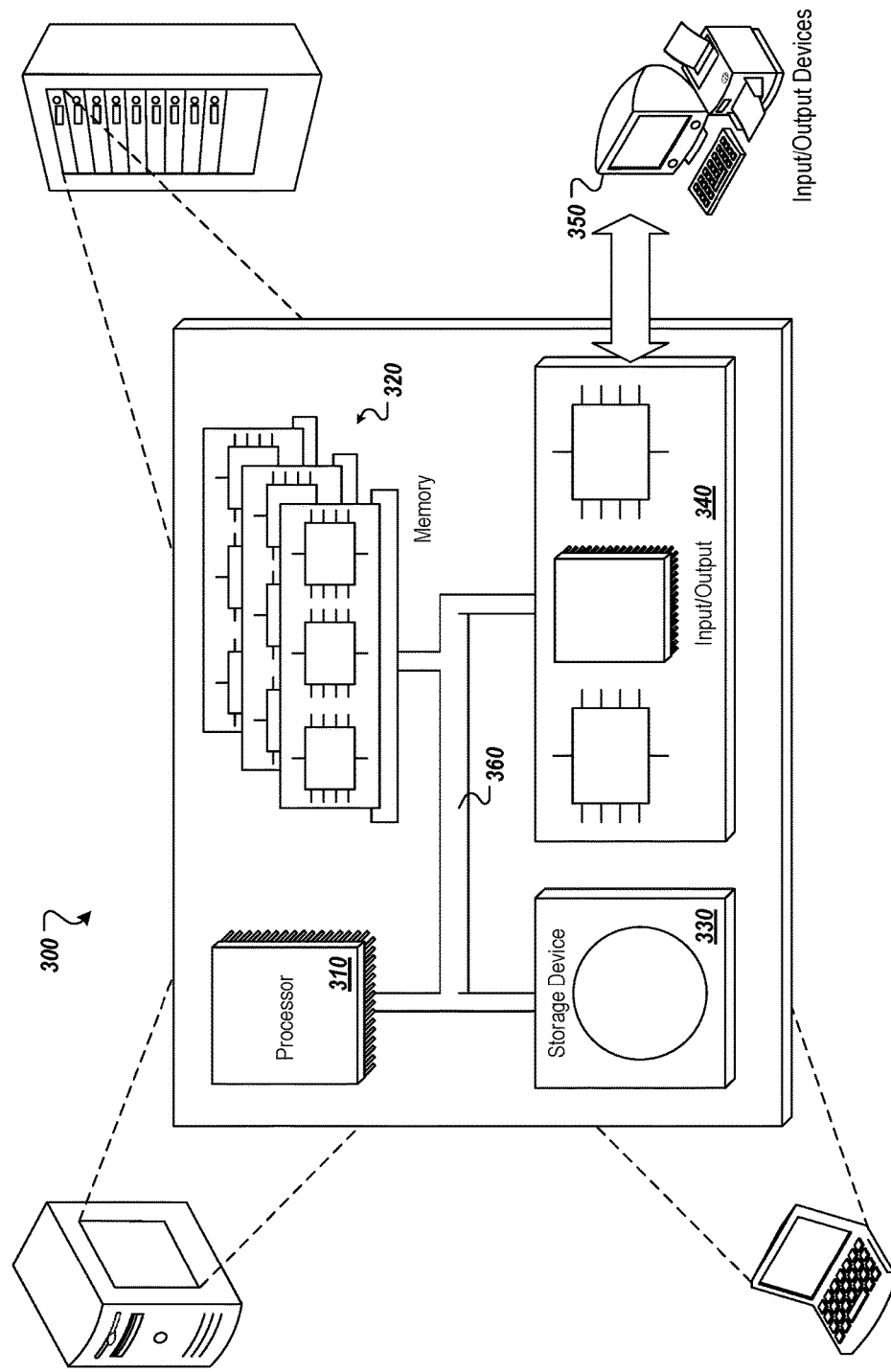
FIG. 3 depicts an example computing system, according to implementations of the present disclosure.

FIG. 3 depicts an example computing system, according to implementations of the present disclosure. The system 300 may be used for any of the operations described with respect to the various implementations discussed herein. For example, the system 300 may be included, at least in part, in the decision management computing device(s) 102 described herein. The system 300 may include one or more processors 310, a memory 320, one or more storage devices 330, and one or more input/output (I/O) devices 350 controllable via one or more I/O interfaces 340. The various components 310, 320, 330, 340, or 350 may be interconnected via at least one system bus 360, which may enable the transfer of data between the various modules and components of the system 300.

The processor(s) 310 may be configured to process instructions for execution within the system 300. The processor(s) 310 may include single-threaded processor(s), multi-threaded processor(s), or both. The processor(s) 310 may be configured to process instructions stored in the memory 320 or on the storage device(s) 330. The processor(s) 310 may include hardware-based processor(s) each including one or more cores. The processor(s) 310 may include general purpose processor(s), special purpose processor(s), or both.

The memory 320 may store information within the system 300. In some implementations, the memory 320 includes one or more computer-readable media. The memory 320 may include any number of volatile memory units, any number of non-volatile memory units, or both volatile and non-volatile memory units. The memory 320 may include read-only memory, random access memory, or both. In some examples, the memory 320 may be employed as active or physical memory by one or more executing software modules.

The storage device(s) 330 may be configured to provide (e.g., persistent) mass storage for the system 300. In some implementations, the storage device(s) 330 may include one or more computer-readable media. For example, the storage device(s) 330 may include a floppy disk device, a hard disk device, an optical disk device, or a tape device. The storage device(s) 330 may include read-only memory, random access memory, or both. The storage device(s) 330 may include one or more of an internal hard drive, an external hard drive, or a removable drive.

One or both of the memory 320 or the storage device(s) 330 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 300. In some implementations, the CRSM may include a data store that provides storage of computer-readable instructions or other information in a non-transitory format. The CRSM may be incorporated into the system 300 or may be external with respect to the system 300. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 310 and the memory 320 may be supplemented by, or incorporated into, one or more application-specific integrated circuits (ASICs).

The system 300 may include one or more I/O devices 350. The I/O device(s) 350 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 350 may also include one or more output devices such as a display, LED(s), an audio output device (e.g., a speaker), a printer, a haptic output device, and so forth. The I/O device(s) 350 may be physically incorporated in one or more computing devices of the system 300, or may be external with respect to one or more computing devices of the system 300.

The system 300 may include one or more I/O interfaces 340 to enable components or modules of the system 300 to control, interface with, or otherwise communicate with the I/O device(s) 350. The I/O interface(s) 340 may enable information to be transferred in or out of the system 300, or between components of the system 300, through serial communication, parallel communication, or other types of communication. For example, the I/O interface(s) 340 may comply with a version of the RS-232 standard for serial ports, or with a version of the IEEE 1284 standard for parallel ports. As another example, the I/O interface(s) 340 may be configured to provide a connection over Universal Serial Bus (USB) or Ethernet. In some examples, the I/O interface(s) 340 may be configured to provide a serial connection that is compliant with a version of the IEEE 1394 standard.

The I/O interface(s) 340 may also include one or more network interfaces that enable communications between computing devices in the system 300, or between the system 300 and other network-connected computing systems. The network interface(s) may include one or more network interface controllers (NICs) or other types of transceiver devices configured to send and receive communications over one or more networks using any network protocol.

Computing devices of the system 300 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 300 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one computing device, the method comprising:
   providing, by the computing device, decision information to an artificial intelligence (AI) engine executing on the at least one computing device, and receiving a decision that is generated by the AI engine based on the decision information;
   providing, by the AI engine executing on the at least one computing device, the decision information and the decision as input to a risk evaluation model stored on the at least one computing device and receiving from the risk evaluation model: i) a risk level that is calculated by the risk evaluation model and that measures a risk associated with the decision, and ii) a confidence level that is calculated by the risk evaluation model and that measures a confidence in the calculated risk level;
   responsive to determining, by a decision analysis module executing on the at least one computing device, that the risk level is greater than a risk threshold and the confidence level is less than a confidence threshold:
      communicating, by the decision analysis module, the decision information and the decision to be reviewed by a first set of reviewers including multiple reviewers characterized by at least two different expertise key words;
      receiving, by the AI engine executing on the at least one computing device, recommendations from the first set of reviewers regarding the decision information; and
      responsive to determining that the recommendations indicate a consensus among the first set of reviewers, modifying, by the AI engine executing on the at least one computing device, the risk evaluation model based on first feedback information including the recommendations from the first set of reviewers, the risk level, and the confidence level; and
   responsive to determining, by the decision analysis module executing on the at least one computing device, that the risk level is less than the risk threshold and the confidence level is within a predetermined range of the confidence threshold:
      communicating, by the decision analysis module, a summary of the decision information for the decision to a second set of reviewers; and
      receiving votes from the second set of reviewers recommending a full review and, in response, modifying, by the AI engine, the risk evaluation model based on second feedback information including the risk level, the confidence level, and the votes recommending the full review.

2. The method of claim 1, further comprising:
   determining, by the at least one processor, a variance among the recommendations from the first set of reviewers;
   wherein the first feedback information further includes the variance.

3. The method of claim 1, wherein the first feedback information further includes at least one monitored outcome of the decision.

4. The method of claim 1, further comprising:
   generating, by the at least one processor, the summary by performing natural language processing (NLP) on the decision information.

5. The method of claim 1, further comprising:
   receiving, by the at least one processor, from the second set of reviewers, at least one expertise key word that characterizes the reviewers to conduct the full review; and communicating, by the at least one processor, the decision information for the decision to be reviewed by at least one reviewer characterized by the one or more expertise key words;

wherein the second feedback information further includes the at least one expertise key word received from the second set of reviewers.

6. The method of claim 1, wherein the second set of reviewers is greater in number than the first set of reviewers.

7. A system, comprising:

at least one processor; and a memory communicatively coupled to the at least one processor, the memory storing instructions which, when executed by the at least one processor, cause the at least one processor to perform operations comprising:

providing decision information to an artificial intelligence (AI) engine and receiving a decision that is generated by the AI engine based on the decision information;

providing, by the AI engine, the decision information and the decision as input to a risk evaluation model and receiving from the risk evaluation model: i) a risk level that is calculated by the risk evaluation model and that measures a risk associated with the decision, and ii) a confidence level that is calculated by the risk evaluation model and that measures a confidence in the calculated risk level;

responsive to determining, by a decision analysis module, that the risk level is greater than a risk threshold and the confidence level is less than a confidence threshold:

communicating, by the decision analysis module, the decision information and the decision to be reviewed by a first set of reviewers including multiple reviewers characterized by at least two different expertise key words;

receiving, by the AI engine, recommendations from the first set of reviewers regarding the decision information; and responsive to determining that the recommendations indicate a consensus among the first set of reviewers, modifying, by the AI engine, the risk evaluation model based on first feedback information including the recommendations from the first set of reviewers, the risk level, and the confidence level; and responsive to determining, by the decision analysis module, that the risk level is less than the risk threshold and the confidence level is within a predetermined range of the confidence threshold:

communicating, by the decision analysis module, a summary of the decision information for the decision to a second set of reviewers; and receiving votes from the second set of reviewers recommending a full review and, in response, modifying, by the AI engine, the risk evaluation model based on second feedback information including the risk level, the confidence level, and the votes recommending the full review.

8. The system of claim 7, the operations further comprising:

determining a variance among the recommendations from the first set of reviewers;

wherein the first feedback information further includes the variance.

9. The system of claim 7, wherein the first feedback information further includes at least one monitored outcome of the decision.

10. The system of claim 7, the operations further comprising:

generating the summary by performing natural language processing (NLP) on the decision information.

11. The system of claim 7, the operations further comprising:

receiving from the second set of reviewers, at least one expertise key word that characterizes the reviewers to conduct the full review; and communicating the decision information for the decision to be reviewed by at least one reviewer characterized by the one or more expertise key words;

wherein the second feedback information further includes the at least one expertise key word received from the second set of reviewers.

12. The system of claim 7, wherein the second set of reviewers is greater in number than the first set of reviewers.

13. One or more non-transitory computer-readable media storing instructions which, when executed by at least one processor, cause the at least one processor to perform operations comprising:

providing decision information to an artificial intelligence (AI) engine and receiving a decision that is generated by the AI engine based on the decision information;

providing, by the AI engine, the decision information and the decision as input to a risk evaluation model and receiving from the risk evaluation model: i) a risk level that is calculated by the risk evaluation model and that measures a risk associated with the decision, and ii) a confidence level that is calculated by the risk evaluation model and that measures a confidence in the calculated risk level;

responsive to determining, by a decision analysis module, that the risk level is greater than a risk threshold and the confidence level is less than a confidence threshold:

communicating, by the decision analysis module, the decision information and the decision to be reviewed by a first set of reviewers including multiple reviewers characterized by at least two different expertise key words;

receiving, by the AI engine, recommendations from the first set of reviewers regarding the decision information; and responsive to determining that the recommendations indicate a consensus among the first set of reviewers, modifying, by the AI engine, the risk evaluation model based on first feedback information including the recommendations from the first set of reviewers, the risk level, and the confidence level; and responsive to determining, by the decision analysis module, that the risk level is less than the risk threshold and the confidence level is within a predetermined range of the confidence threshold:

communicating, by the decision analysis module, a summary of the decision information for the decision to a second set of reviewers; and receiving votes from the second set of reviewers recommending a full review and, in response, modifying, by the AI engine, the risk evaluation model based on second feedback information including the risk level, the confidence level, and the votes recommending the full review.

14. The one or more non-transitory computer-readable media of claim 13, the operations further comprising:

determining a variance among the recommendations from the first set of reviewers;

wherein the first feedback information further includes the variance.

15. The one or more non-transitory computer-readable media of claim 13, wherein the first feedback information further includes at least one monitored outcome of the decision.

16. The one or more non-transitory computer-readable media of claim 13, the operations further comprising:

generating the summary by performing natural language processing (NLP) on the decision information.

17. The one or more non-transitory computer-readable media of claim 13, the operations further comprising:

receiving from the second set of reviewers, at least one expertise key word that characterizes the reviewers to conduct the full review; and communicating the decision information for the decision to be reviewed by at least one reviewer characterized by the one or more expertise key words;

wherein the second feedback information further includes the at least one expertise key word received from the second set of reviewers.

* * * * *